(12) United States Patent
Sip

(10) Patent No.: US 8,162,551 B2
(45) Date of Patent: Apr. 24, 2012

(54) KEYBOARD USING KINETIC ENERGY OF KEYSTROKE TO GENERATE ELECTRICITY

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 474 days.

(21) Appl. No.: 12/494,324

(22) Filed: Jun. 30, 2009

(65) Prior Publication Data

US 2010/0239345 A1    Sep. 23, 2010

(30) Foreign Application Priority Data

Mar. 21, 2009   (CN) .......................... 2009 1 0301019

(51) Int. Cl.
*G06F 3/023* (2006.01)

(52) U.S. Cl. ...................................... 400/477; 400/474

(58) Field of Classification Search .................. 400/472, 400/490, 495, 495.1, 474, 477, 479; 341/22
See application file for complete search history.

(56) References Cited

U.S. PATENT DOCUMENTS 5,911,529 A * 6/1999 Crisan ........................... 400/472

FOREIGN PATENT DOCUMENTS

| JP | 2001154783 A | * | 6/2001 |
| JP | 2003108287 A | * | 4/2003 |
| JP | 2003233448 A | * | 8/2003 |

* cited by examiner

*Primary Examiner* — Daniel J Colilla
(74) *Attorney, Agent, or Firm* — Altis Law Group, Inc.

(57) ABSTRACT

A keyboard is configured for using the kinetic energy of the keystroke to generate electricity, the keyboard includes a key, a base, a resilient element connecting to the key and the base to restore the key after the key is pressed, a transmission device slidably connected to the base, and a generator engaged with the transmission device. When the key is pressed, the transmission device is forced to slide on the base by the key and drive the generator to generate electricity.

10 Claims, 9 Drawing Sheets

KEYBOARD USING KINETIC ENERGY OF KEYSTROKE TO GENERATE ELECTRICITY

BACKGROUND

1. Technical Field

The present disclosure relates to keyboards and, particularly, to a keyboard capable of utilizing kinetic energy of keystrokes thereon.

2. Description of Related Art

Wireless keyboards have been developed to facilitate input operations of computers. These wireless keyboards are typically powered by batteries and therefore increase the overall costs of the keyboards. On the other hand, kinetic energy of keystroke on the keyboards is wasted.

Therefore, there is room for improvement in the art; a keyboard which can utilize the kinetic energy of keystrokes.

BRIEF DESCRIPTION OF THE DRAWINGS

Many aspects of the present embodiments can be understood with reference to the figures. The components in the figures are not necessarily drawn to scale, the emphasis instead being placed upon clearly illustrating the principles of the present embodiments. Moreover, in the figures, like reference numerals designate corresponding parts throughout the several views.

DETAILED DESCRIPTION

Figure 1:
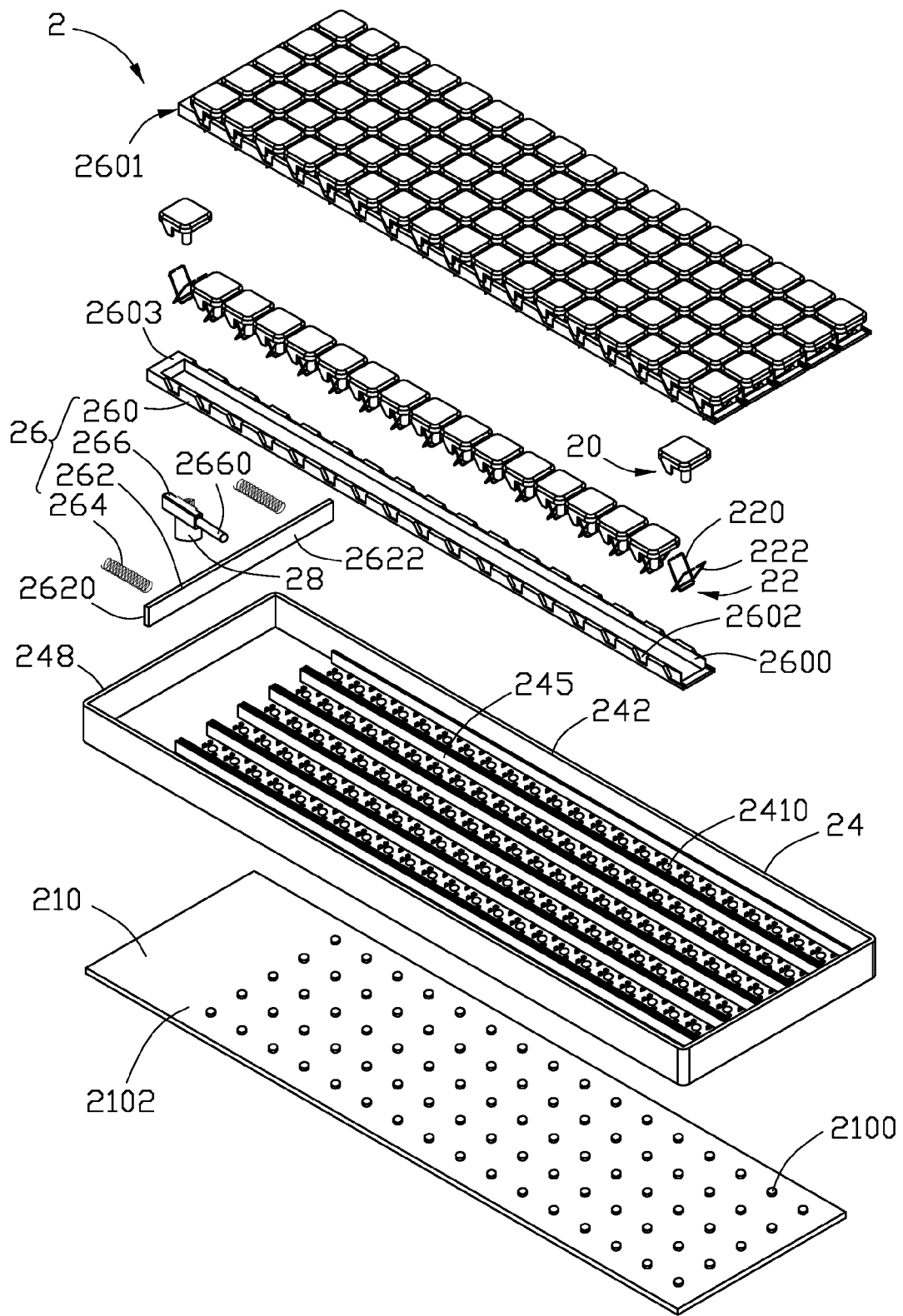
FIG. 1 is an exploded, isometric view of an exemplary embodiment of a keyboard.

Referring to FIG. 1, a keyboard 2 in accordance with an exemplary embodiment is illustrated. The keyboard 2 includes a matrix of keys 20, a matrix of resilient elements 22, a base 24, a transmission device 26, a generator 28, and a sensing board 210.

Figure 2:
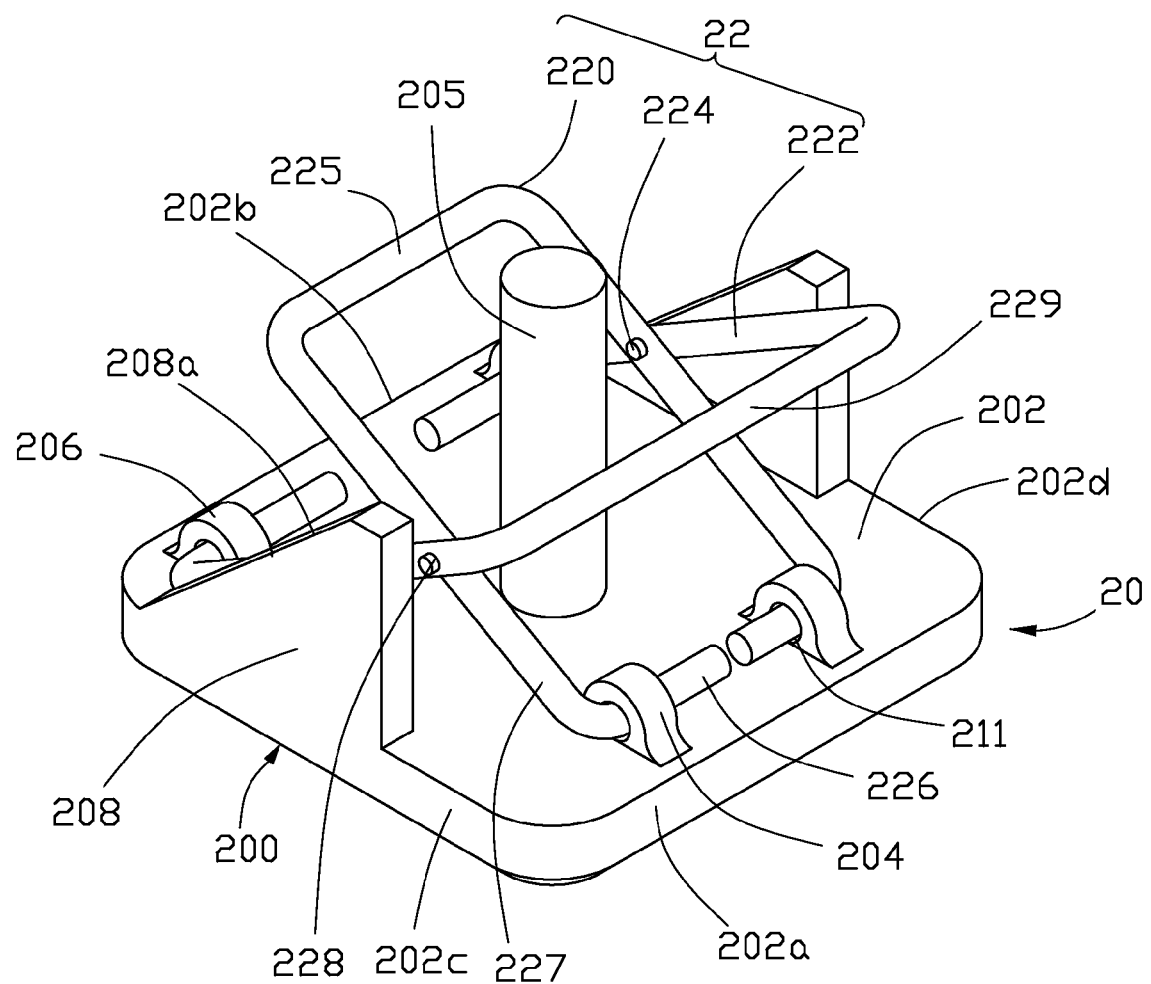
FIG. 2 is an isometric, schematic view of a resilient element and a key of the keyboard of FIG. 1.

Referring to FIG. 2, each of the keys 20 is generally a rectangular sheet and includes a first upper surface 200 for being pressed, a first bottom surface 202 opposite to the first upper surface 200, a pair of first joining members 204, a pair of second joining members 206, a pair of triangular sidewalls 208, and a stem 205. The first joining members 204, the second joining members 206, the triangular sidewalls 208, and the stem 205 are formed on the first bottom surface 202. The pair of first joining members 204 and the pair of second joining members 206 are positioned at opposite edges 202a, 202b of the first bottom surface 202. The two triangular sidewalls 208 are positioned at the other opposite edges 202c, 202d of the first bottom surface 202. The stem 205 is positioned generally at the center of the first bottom surface 202.

In particular, each of the first joining members 204 is generally a semi-cylindrical projection substantially extending perpendicularly from the first bottom surface 202 and defines a pivot hole 211. The pivot holes 211 of the first joining members 204 are aligned with each other. Each of the second joining members 206 is substantially similar to the first joining member 204 and accordingly defines a pivot hole 211. The pivot holes 211 of the second joining members 206 are aligned with each other. The distance between the first joining members 204 is longer than that of the second joining members 206.

The triangular sidewalls 208 substantially extend perpendicularly from the first bottom surface 202 and includes a first sloping surface 208a extending obliquely from the first bottom surface 202 at a predetermined angle.

The stem 205 is generally a cylinder substantially extending perpendicularly from the first bottom surface 202.

The resilient element 22 includes a first rectangular supporting rack 220, a second rectangular supporting rack 222, and a pair of fastening members 224. The first rectangular supporting rack 220 includes a middle portion 225, two side portions 227, and two ends 226. The two side portions 227 extend from two opposite ends of the middle portion 225 correspondingly and are substantially perpendicular to the middle portion 225 and are parallel to each other. The ends 226 extend from the opposite ends of the two side portions 227 correspondingly towards each other and are substantially perpendicular to the side portions 247. Each of the side portions 227 defines a joining hole 228 in the middle. The two joining holes 228 are aligned with each other. The second rectangular supporting rack 222 is substantially similar to the first rectangular supporting rack 220 in shaped and includes the counterparts of the first rectangular supporting rack 220.

The length of the middle portion 225 of the first rectangular supporting rack 220 is a little longer than the distance between the first joining members 204 and the length of the middle portion 229 of the second rectangular supporting rack 222 is a little longer than the distance between the second joining members 206. The first rectangular supporting rack 220 and the second rectangular supporting rack 222 are coupled to each other by inserting a fastening member 224 through the corresponding joining holes 228. The first rectangular supporting rack 220 and the second rectangular supporting rack 222 should be made of resilient material.

Figure 3:
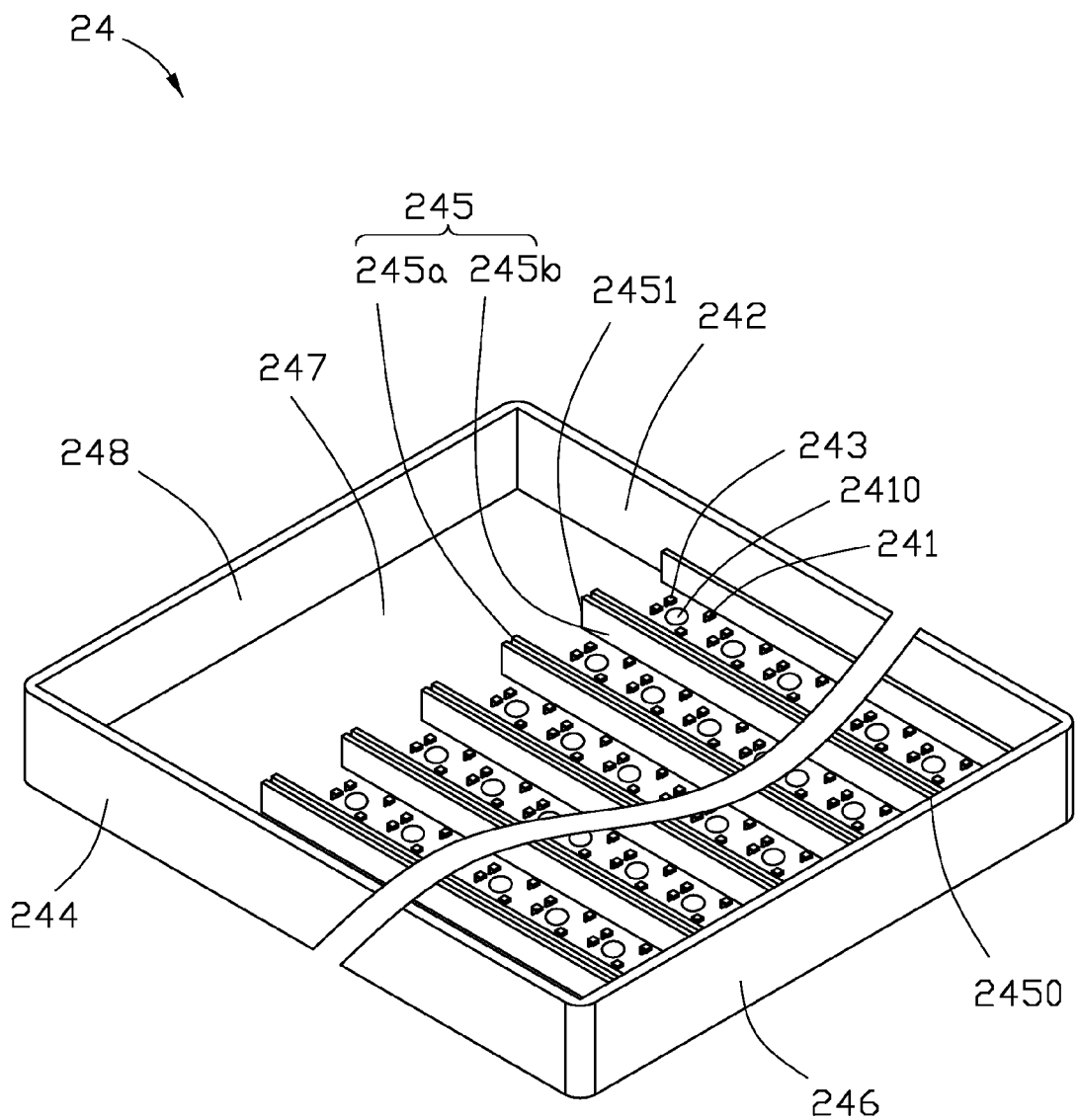
FIG. 3 is an isometric, schematic, partial view of a base of the keyboard of FIG. 1.
Figure 4:
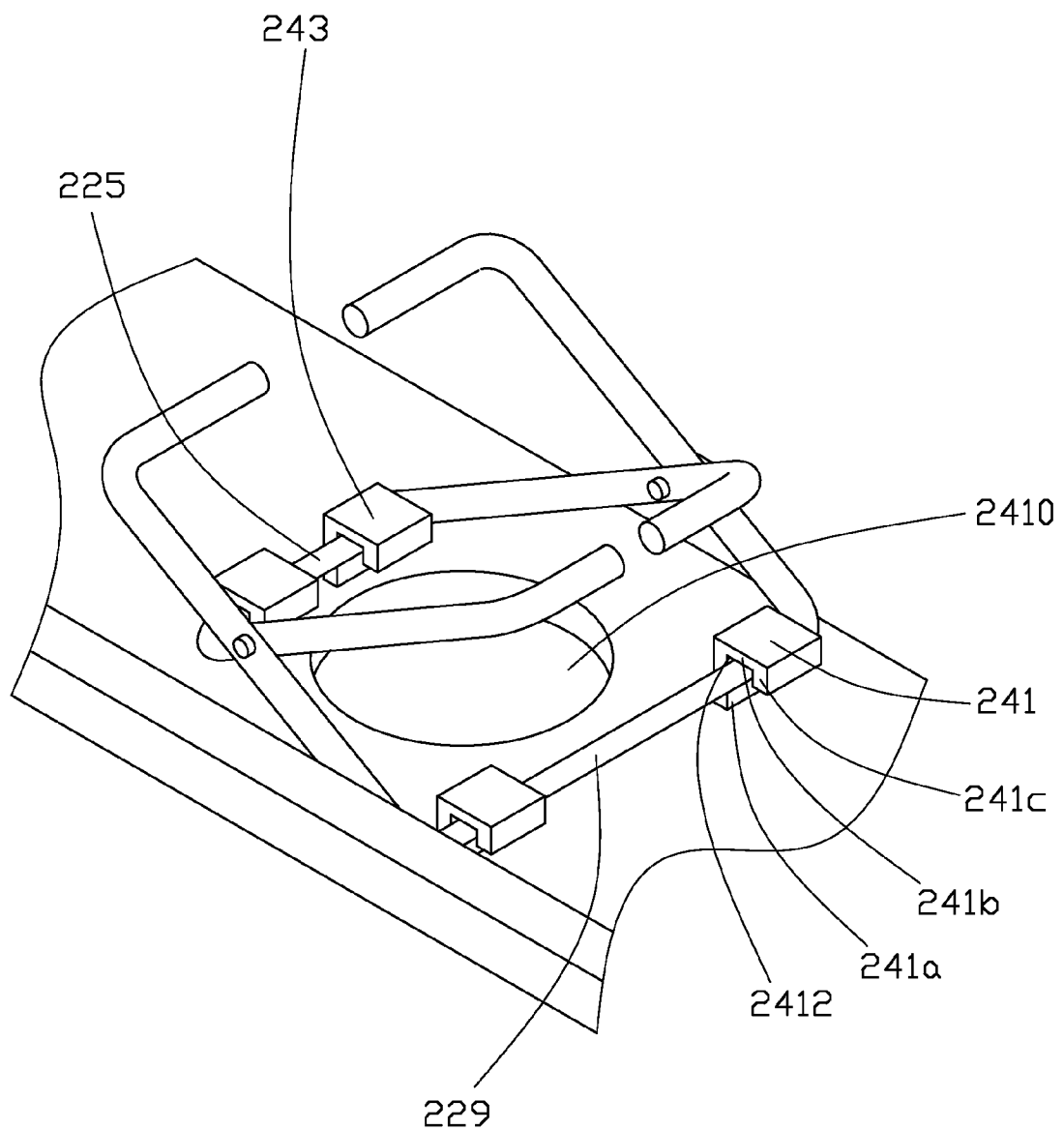
FIG. 4 is an isometric, schematic, partial view of a resilient element and a base of the keyboard of FIG. 1.

Referring to FIG. 3 and FIG. 4, the base 24 includes a first sidewall 242, a second sidewall 244, a third sidewall 248, a fourth sidewall 246, a rectangular bottom board 247, a number of first limiting members 241, a number of second limiting members 243, and a number of sliding rail 245.

The first sidewall 242, the second sidewall 244, the third sidewall 248, and the fourth sidewall 246 substantially extend perpendicularly from the four edges of the rectangular bottom board 247 correspondingly, thereby defining a rectangular receiving space. In addition, the rectangular bottom board 247 defines a matrix of through holes 2410 therein.

Each pair of the first limiting members 241 and each pair of the second limiting member 243 are formed on the rectangular bottom board 247 and positioned at opposite sides of the corresponding through holes 2410. Each pair of first limiting members 241 are arranged in a line substantially parallel to the fourth sidewall 246. Each pair of second limiting members 243 are arranged in a line substantially parallel to the fourth sidewall 246. The first limiting member 241 includes a first portion 241a, a second portion 241b, and a third portion 241c. The first portion 241a is a plate perpendicularly extending away from the rectangular bottom board 247. The second portion 241b is also a plate substantially extending perpendicularly from the distal end of the first portion 241a. The third portion 241c is also a plate substantially extending perpendicularly from the distal end of the second portion 241c. Therefore, the first limiting member 241 defines a gap 2412 between the first portion 241a, the second portion 241b, and the third portion 241c. The second limiting member 243 is substantially similar to the first limiting member 241 in shape and includes the counterparts of the first limiting member 241. The distance between the first limiting members 241 is longer than that of the second limiting members 243.

Each of the sliding rails 245 includes two parallel elongated plates 245a, 245b substantially extending perpendicularly from the rectangular bottom board 247 at the opposite sides of each row of through holes 2410. Each elongated plate 245a/245b includes a first end 2450 and a second end 2451. The first end 2450 is connected to the fourth sidewall 246. The second end 2451 is adjacent to but spaced away from the third sidewall 248.

Figure 5:
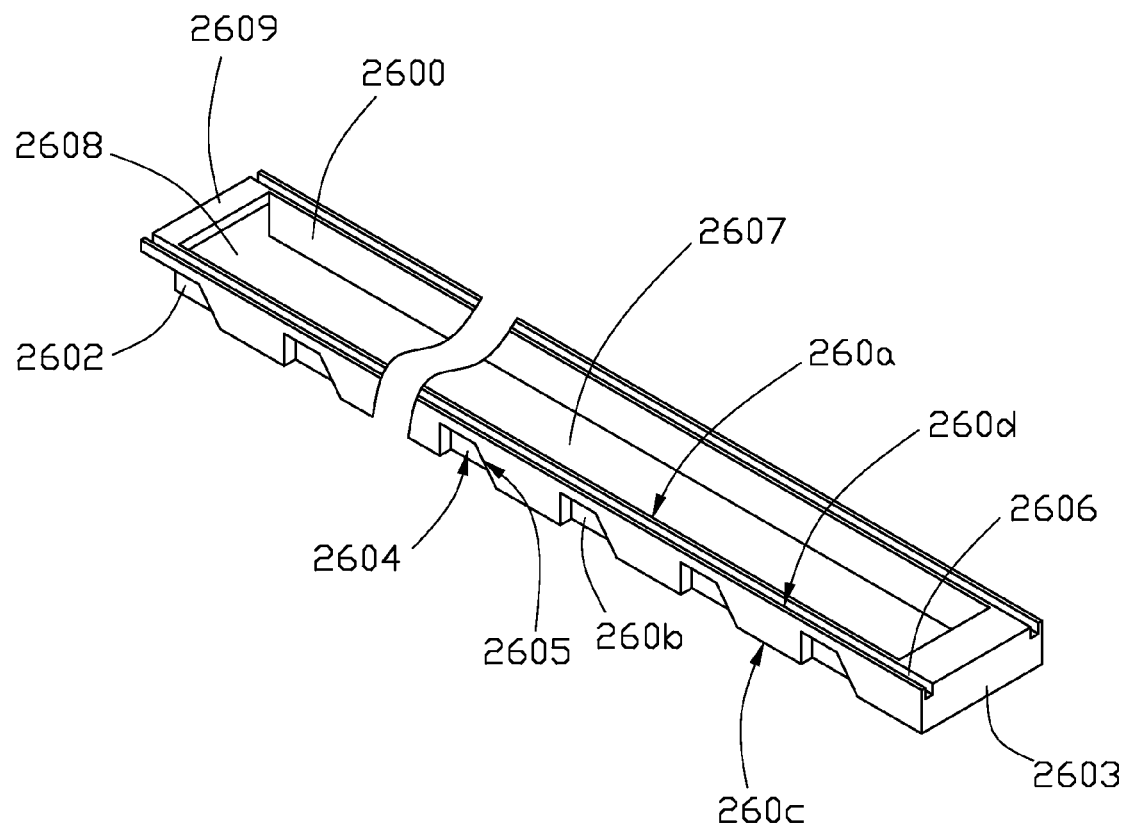
FIG. 5 is an isometric, schematic, partial view of a sliding frame of the keyboard of FIG. 1.

Referring to FIG. 1 and FIG. 5, the transmission device 26 includes a number of sliding frames 260, a transmission board 262, a transmission rod 266, and a number of springs 264. Each of the sliding frames 260 includes a fifth sidewall 2600, a sixth sidewall 2602, a transmission plate 2603 and a connecting plate 2609. The fifth sidewall 2600 and the sixth sidewall 2602 are parallel to each other and are spaced with generally the same distance between the two elongated plates 245a, 245b of the sliding rails 245. The transmission plate 2603 connects one end of the fifth sidewall 2600 and a corresponding end of the sixth sidewall 2602. The other ends of the fifth and sixth sidewalls 2600, 2602 are coupled to each other by the connecting plate 2609. The fifth sidewall 2600, the sixth sidewall 2602, and the transmission plate 2603 and the connecting plate 2609 cooperatively defined a channel 2607 with an opening 2608. Each of the fifth sidewalls 2600 and the sixth sidewalls 2602 include an inner surface 260a, an outer surface 260b opposite to the inner surface 260a, a second upper surface 260c, and a second bottom surface 260d opposite to the second upper surface 260c. The fifth and sixth sidewalls 2600, 2602 each defines an elongated sliding groove 2606 in the second bottom surface 260d and a number of grooves 2604 having uniform pitches in the intersecting portion of the outer surface 260b and the second upper surface 260c. Each of the grooves 2604 corresponds to the triangular sidewall 208 in shape. That is, each groove 2604 defines a second sloping surface 2605 sloping down from the second upper surface 260c at the predetermined angle.

The transmission board 262 includes a connecting surface 2620 and a transmission surface 2622 opposite to the connecting surface 2620. The length of the transmission board 262 is a little shorter than the distance between the first sidewall 242 and the second sidewall 244 of the base 24.

Figure 6:
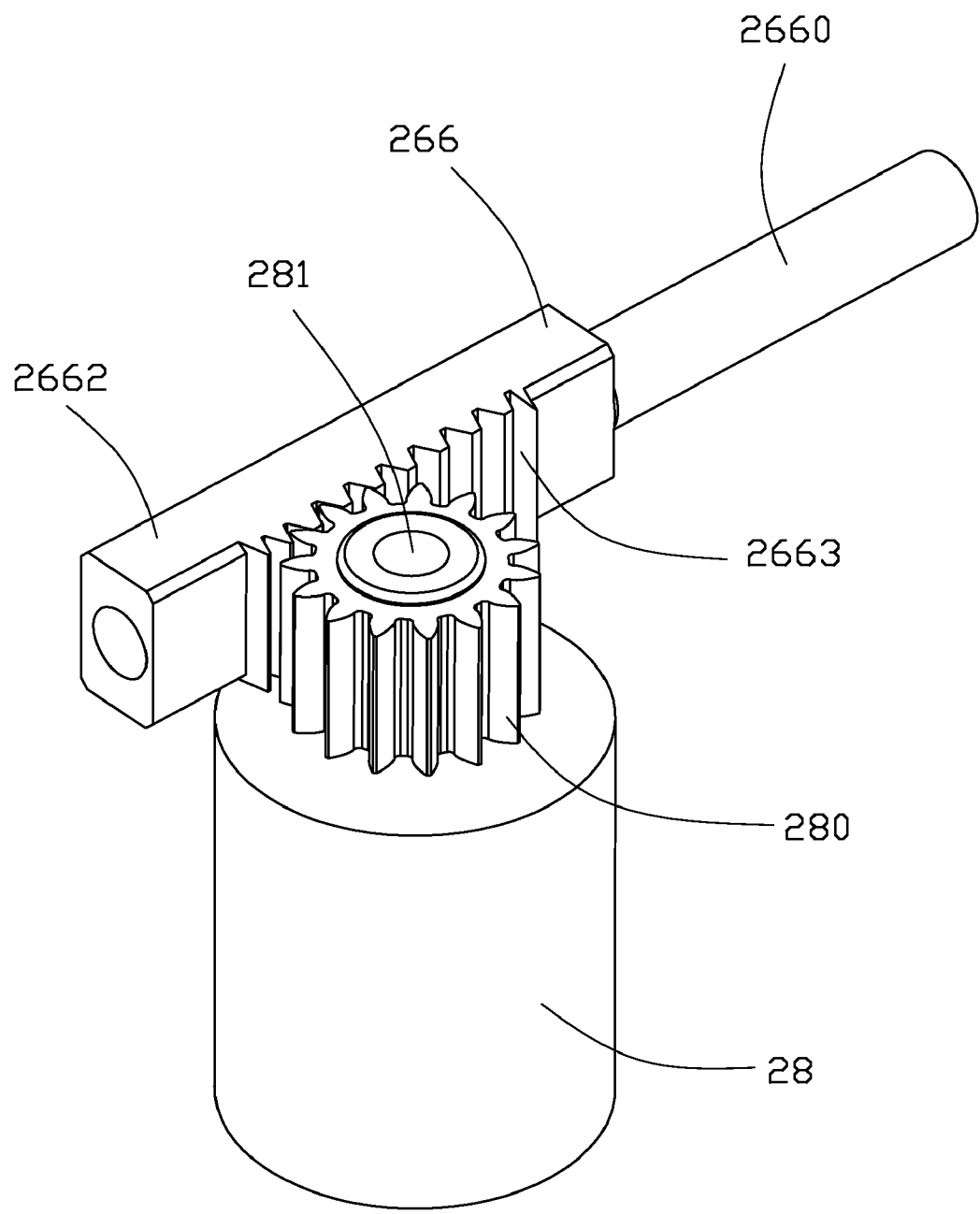
FIG. 6 is an isometric, schematic, view of a transmission rod and a generator of the keyboard of FIG. 1.

Also referring to FIG. 6, the transmission rod 266 includes a connecting end 2660, a transmission end 2662, and a rack 2663. The connecting end 2660 is cylindrical and connected to the connecting surface 2620. The transmission end 2662 is rectangular. The rack 2663 is formed on the transmission end 2662 for converting the sliding motion of sliding frame 260 to rotational motion of the generator 28.

The springs 264 are configured for connecting the transmission board 262 with the third sidewall 248 and providing a return energy of the transmission board 262.

The generator 28 includes a rotation portion 281 and a gear 280. The gear 280 is fixed on the end of the rotation portion 281.

The sensing board 210 includes a sensing surface 2102 and a matrix of electrical switches 2100. The electrical switches 2100 are disposed on the sensing surface 2102 corresponding to the through holes 2410.

Figure 7:
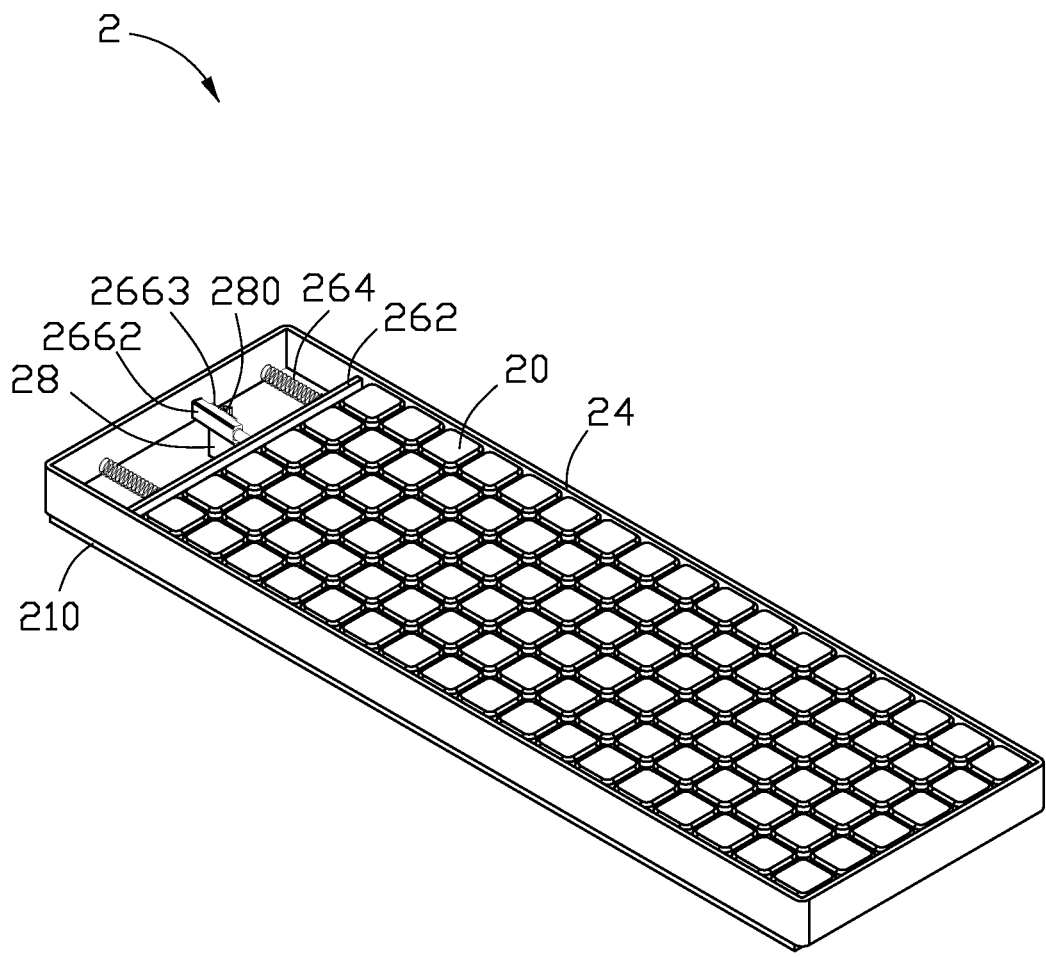
FIG. 7 is an assembled, isometric view of the keyboard of FIG. 1.

In assembly, referring to FIG. 1 and FIG. 7, the sliding frames 260 are disposed on the corresponding sliding rails 245 with the transmission plate 2603 facing the third sidewall 248, and the fifth sidewall 2600 and the sixth sidewall 2602 are parallel to the first sidewall 242.

The first and second rectangular supporting racks 220, 222 pass through the channel 2607 and rotatably connect to the base 24 via disposing the middle portion 225/229 (see FIG. 4) in the gap 2412 (see FIG. 4). Each key 20 are rotatably connected to the first and second supporting racks 220, 222 via inserting the end 226 (see FIG. 2) through the pivot hole 211 (see FIG. 2) correspondingly.

Before the key 20 is pressed, the transmission plates 2603 are aligned with each other and define a stress surface 2601. The transmission board 262 is perpendicularly disposed on the rectangular bottom board 247 with the transmission surface 2622 contacted with the stress surface 2601 and the connecting surface 2620 faced to the third sidewall 248. The transmission rod 266 is connected to the transmission board 262 via the connecting end 2660 fixed on the connecting surface 2620 of the transmission board 262. The gear 280 of the generator 28 is meshed with the rack 2663 of the transmission rod 266. One end of the spring 264 is connected to the third sidewall 248 of the base 24 and the other end of the spring 264 is connected to the connecting surface 2620 of the transmission board 262. The through holes 2410 of the base 24 are aligned with the stem 205 of each key 20 correspondingly. The sensing board 210 is disposed beneath the rectangular bottom board 247 of the base 24 with the electrical switches 2100 aligned with the through holes 2410 of the base 24.

Figure 8:
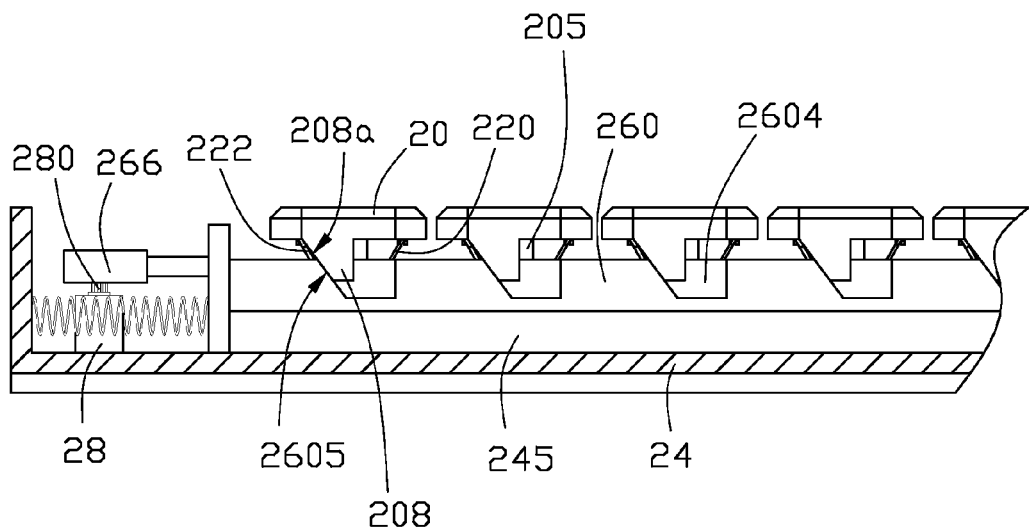
FIG. 8 is a cross-sectional, partial view of the keyboard of FIG. 1 when the key is not pressed.
Figure 9:
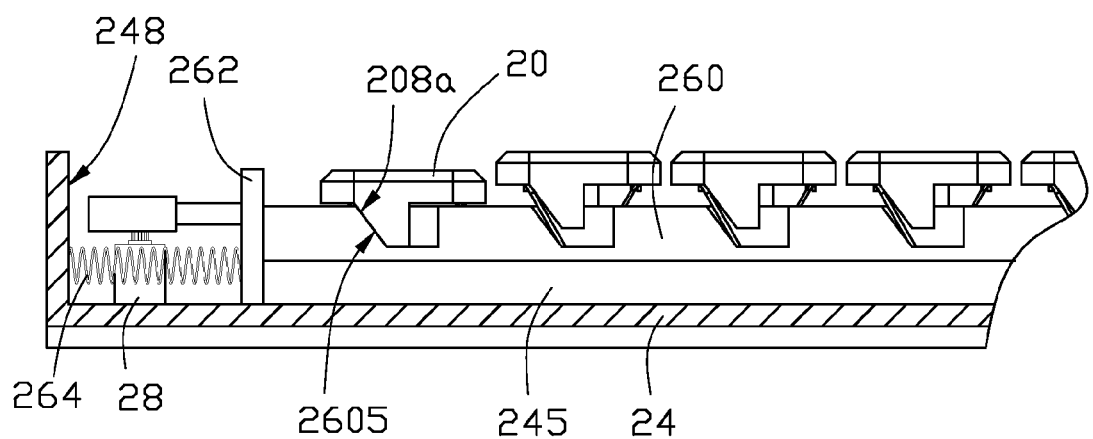
FIG. 9 is a cross-sectional, partial view of the keyboard of FIG. 1 when the key is pressed.

In use, referring to FIG. 8 and FIG. 9, when the key 20 is pressed, the first and second supporting racks 220, 222 deform, the triangular sidewalls 208 slide into the corresponding grooves 2604 via the first sliding surface 208a slidablely engaged with the second sliding surface 2605. The sliding frame 260 is forced by the pressed key 20 to slide along the corresponding sliding rails 245. The transmission board 262 is pushed by the sliding frame 260 and moves toward the third sidewall 248. The transmission rod 266 is moved with the transmission board 262 and drives the generator 28 to generate electricity via engaging the gear 280 of the generator 28 with the rack 2663 (see FIG. 6) on the transmission rod 266. The generator 28 is connected to a rechargeable battery (not shown) via a charge circuit (not shown). Therefore, the electrical energy generated by the generator 28 can be stored in the battery for lengthening the working time of a computer using the keyboard 2.

The keyboard 2 uses the transmission device 260 slidablely connected to the base 24 to convert the pressing motion of the keystroke to the rotational motion of the generator 28. Therefore, the amassed energy of the keystroke can be used to generate electricity for lengthening the working time of the computer using the keyboard 2.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A keyboard comprising:
a key comprising a sheet for being pressed; the sheet comprising a first sloping surface extending obliquely from the bottom of the sheet;
a base comprising a sliding rail;
a resilient element connecting the key to the base and configured to restore the key after the key is pressed towards the base and released;
a transmission device slidably disposed on the sliding rail and comprising a sidewall, the sidewall defining a groove in the top thereof, the groove defining a second sloping surface sloping down from the top of the sidewall, the transmission device being positioned so that during key pression, the transmission device is forced to slide on the sliding rail due to a sliding motion of the second sloping surface on the first sloping surface; and
a generator meshed with the transmission device, the generator being configured for converting kinetic energy of the sliding transmission device into electrical energy.

2. The keyboard as claimed in the claim 1, wherein: the sheet further comprises a first upper surface for being pressed, a first bottom surface opposite to the first upper surface, a pair of first joining members, a pair of second joining members and a stem; the first joining member, the second joining member, and the stem are formed on the first bottom surface; the base further comprises a first sidewall, a second sidewall, a third sidewall, a fourth sidewall, a bottom board, a through hole, a pair of first limiting members, and a pair of second limiting members; the first sidewall, the second sidewall, the third sidewall, and the fourth sidewall substantially extend perpendicularly from the four edges of the bottom board correspondingly and define a receiving space; the through hole defined in the bottom board corresponding to the keys; the resilient element comprises a first supporting rack, a second supporting rack and a pair of fastening members; the first supporting rack and the second supporting rack are coupled to each other by the fastening members; the first supporting rack is rotatably connected to the first joining member by one end and rotatably connected to the first limiting member by the other end; and the second supporting rack is rotatably connected to the second joining member by one end and rotatably connected to the second limiting member by the other end.

3. The keyboard as claimed in claim 2, wherein each of the first and second joining members is semi-cylindrical projection substantially extending perpendicularly from the first bottom surface and defines a pivot hole therethrough.

4. The keyboard as claimed in claim 3, wherein: each of the first and second supporting racks comprises a middle portion, two side portions, and two ends, the two side portions extended from two opposite ends of the middle portion correspondingly and being substantially perpendicular to the middle portion, the ends extended from the opposite ends of the two side portions correspondingly towards each other and being substantially perpendicular to the side portions; each of the side portions defines a joining hole at the middle thereof, the joining holes aligned with each other; the first supporting rack and the second supporting rack are coupled to each other by inserting a fastening member through the joining holes correspondingly; and the first and second supporting racks are rotatably connected to the key via rotatably inserting the ends through the pivot holes.

5. The keyboard as claimed in claim 4, wherein: the first limiting member and the second limiting member are correspondingly formed on the bottom board at opposite sides of the through hole; the first limiting member comprises a first portion, a second portion and a third portion; the first portion is a plate perpendicularly extending away from the bottom board; the second portion is also a plate substantially extending perpendicularly from the distal end of the first portion; the third portion is also a plate substantially extending perpendicularly from the distal end of second portion; the second limiting member is substantially similar to the first limiting member in shape and comprises the counterpart of the first limiting member; the first and second supporting racks are rotatably connected to the first limiting member and the second limiting member via disposing the middle portion in a gap defined between the first portion, the second portion, and a third portion.

6. The keyboard as claimed in the claim 2, wherein: each of the sliding rails comprises two parallel elongated plates substantially extending perpendicularly from the bottom board at opposite sides of the through hole; the elongated plate comprises a first end and a second end; and the first end is perpendicularly connected to the fourth sidewall of the base and the second end is adjacent to but spaced away from the third sidewall.

7. The keyboard as claimed in the claim 6, wherein the transmission device comprises a sliding frame, a transmission board contacted with the sliding frame, a transmission rod connected to the transmission board, and a plurality of springs connecting the transmission board with the base for providing a return action of the transmission board.

8. The keyboard as claimed in the claim 7, wherein: the sliding frame comprises a fifth sidewall, a sixth sidewall, a transmission plate and a connecting plate; the fifth sidewall and the sixth sidewall are parallel to each other and spaced with the generally same distance between the two elongated plates of the sliding rail; the transmission plate perpendicularly connects one end of the fifth sidewall and a corresponding end of the sixth sidewall; the other end of the fifth and sixth sidewalls are connected to each other by the connecting plate; the transmission board comprises a connecting surface and a transmission surface contacted with the transmission plate of the sliding frame; the transmission rod comprises a connecting end, a transmission end, and a rack formed on the transmission end; and the connecting end is connected to the connecting surface of the transmission board.

9. The keyboard as claimed in the claim 8, wherein: each of the fifth sidewall and the sixth sidewall comprises an inner surface, an outer surface opposite to the inner surface, a second upper surface, and a second bottom surface opposite to the second upper surface; the fifth and sixth sidewall each defines an elongated sliding groove in the second bottom surface and the groove is in the intersection portion of the outer surface and the second upper surface; and the sliding frame is slidablely connected to the base via disposing the sliding grooves on the corresponding sliding rails.

10. The keyboard as claimed in the claim 2, wherein the keyboard further comprises a sensing board disposed beneath the bottom board of the base; the sensing board comprises a sensing surface and an electrical switch formed on the sensing surface; and the stem passes through the through hole and touches the electrical switch to trigger an electrical signal.

* * * * *